US007155701B1

United States Patent
Gongwer et al.

(10) Patent No.: US 7,155,701 B1
(45) Date of Patent: *Dec. 26, 2006

(54) SYSTEM FOR DYNAMICALLY CONSTRUCTING AN EXECUTABLE COMPUTER PROGRAM

(75) Inventors: R. Scott Gongwer, Acton, MA (US); Joseph J. Tamburino, Hudson, MA (US); Kurt Larson, Watertown, MA (US); Bill Baker, Woodinville, WA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1212 days.

(21) Appl. No.: 08/866,744

(22) Filed: May 30, 1997

(51) Int. Cl.
G06F 17/30 (2006.01)
G06F 9/44 (2006.01)

(52) U.S. Cl. .................................. 717/106; 707/103 R (58) Field of Classification Search ................ 707/103, 707/9, 10, 103 R; 395/707, 704, 183, 161, 395/685; 717/100, 106, 107
See application file for complete search history.

(56) References Cited

U.S. PATENT DOCUMENTS 5,339,392 A * 8/1994 Risberg et al. ............. 395/161
5,421,016 A * 5/1995 Conner et al. ............. 395/707
5,574,903 A * 11/1996 Szymanski et al. ............ 707/9
5,651,111 A * 7/1997 McKeeman et al. ........ 395/183
5,659,752 A * 8/1997 Heisch et al. ............... 395/704
5,812,848 A * 9/1998 Cohen ......................... 395/685

OTHER PUBLICATIONS

Adrian Cockcroft, Which is better, static or dynamic linking?, Feb. 1996, SunWorld, http://sunsite.uakom.sk/sunworldonline/swol-02-1996/swol-02-per.html, pp. 1-6.*
Dynamic-Link Entry-Point Function, 2005, Microsoft, http://msdn.microsoft.com/library/default.asp?url=/library/en-us/dllproc/base/run_time_dynamic_linking.asp.*
Petzold, C., Programming Windows 95, The Definitive Developer's Guide to the Windows 95 API, Microsoft Press, (1996). Chapter 19, "Dynamic Link Libraries," pp. 959-985, Chapter 20, "What's This Thing Called Ole?", pp. 987-1060.

* cited by examiner

Primary Examiner—Jeffery A. Brier
(74) Attorney, Agent, or Firm—Chapin IP Law, LLC; Barry W. Chapin, Esq.

(57) ABSTRACT

An executable computer program is dynamically constructed by tightly coupling a plurality of dynamically loadable modules. Each modules includes a fully encapsulated function which is typically called from another module. A registration system is employed to associate a pointer with each defined function. In the modules, at run time, each function call is resolved using the associated pointer from the registration system. In particular, each function call is dereferenced by the associated pointer. Consequently, the resulting executable computer program is both flexible and efficient.

99 Claims, 6 Drawing Sheets

FIG. 6

SYSTEM FOR DYNAMICALLY CONSTRUCTING AN EXECUTABLE COMPUTER PROGRAM

BACKGROUND

A typical method of constructing an executable computer program includes compiling a plurality of source code files into machine-code object files. These object files are then linked together at build time to yield a tightly-coupled monolithic executable image. For complex applications, the executable can be quite large. Although monolithic executables operate efficiently, they have a number of drawbacks, including difficulty in programming, constructing, testing, and modifying the software.

Those drawbacks can be somewhat overcome by employing a modular architecture, where the software is divided into smaller, distinct modules that are linked together at run time. While such a modular architecture is more manageable than a monolithic structure, it executes less efficiently because it is less tightly integrated.

SUMMARY OF THE INVENTION

Preferred embodiments of the invention provide a compromise between the tightly-coupled monolithic and the loosely-coupled modular approaches to software construction. Specifically, preferred embodiments of the invention provide a flexible modular architecture which enables modular boundaries to be freely modified, thereby realizing full benefits of a modular architecture. At the same time, the various modules are tightly bound together at run time. As a consequence, the resulting software runs more efficiently than prior art modular architectures.

In accordance with a preferred embodiment of the invention, an executable computer program is constructed from a plurality of dynamically loadable modules. Each module is compiled from a respective source code file which defines a respective entry point for at least one function called by the program. Preferably, the functions are fully encapsulated in their defining modules and may reference thread local data. A user-modifiable configuration file specifies the modules and their respective file locations to the construction system.

During an initialization phase of the program, a list of the modules which define functions called by the program is created from the configuration file and stored in a module database. In particular, the modules are listed in a specific load order.

For the modules in the list, the defined interfaces are registered in an interface database. In particular, an identifier for each defined interface is stored in the interface database and a pointer is associated with the stored identifier. The pointer references a list of function pointers in the corresponding module. Preferably, the interface database supports multiple generations of interfaces by registering each generation with a separate identifier.

Each module typically calls functions from other modules. These function references are resolved during initialization from the data stored in the interface database. In particular, each call to a function is dereferenced with the appropriate stored pointer.

In accordance with one aspect of the invention, the modules are loaded so all function interfaces required by a particular module are registered before the calling module is loaded. This ordinal structure facilitates an orderly construction and destruction procedure for the program.

The above and other features of the invention, including various novel details of construction and combination of parts, will now be more particularly described with reference to the accompanying drawings and pointed out in the claims. It will be understood that the particular system for dynamically constructing an executable computer program embodying the invention is shown by way of illustration only and not as a limitation of the invention. The principles and features of this invention may be embodied in varied and numerous embodiments without departing from the scope of the invention.

DETAILED DESCRIPTION OF PREFERRED EMBODIMENTS OF THE INVENTION

Figure 1:
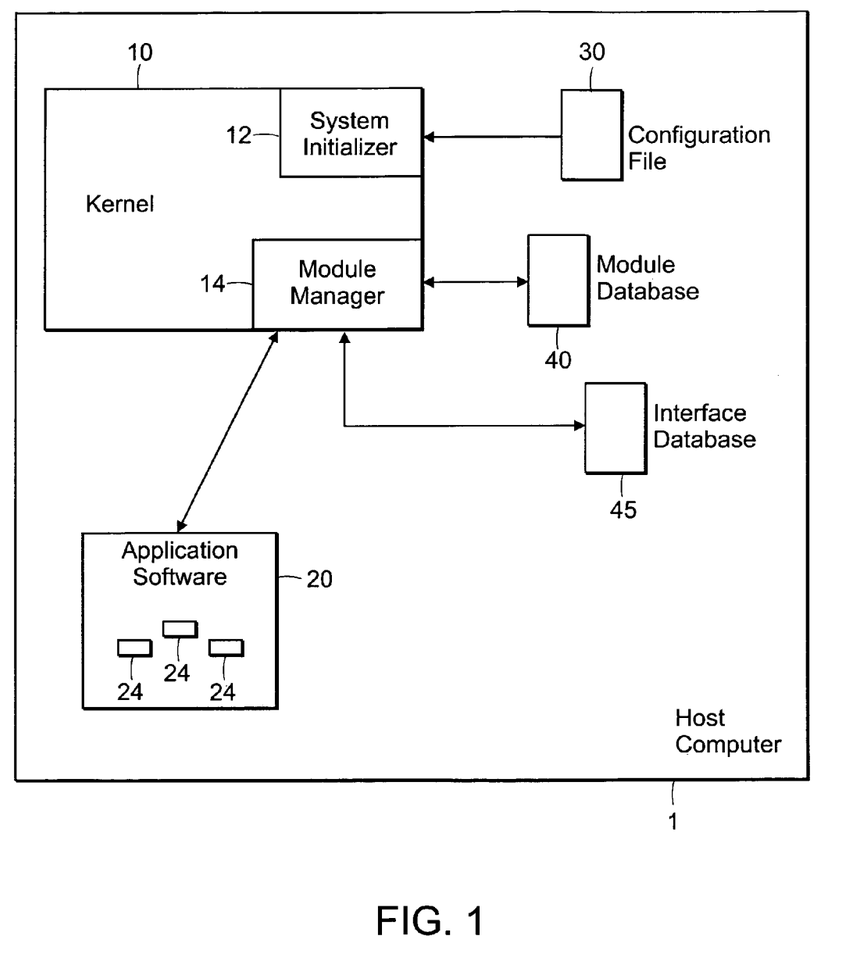
FIG. 1 is a schematic block diagram of a preferred system for dynamically constructing an executable computer program.

FIG. 1 is a schematic block diagram of a preferred system for dynamically constructing an executable computer program. Illustrated is a host computer system 1 having an operating system kernel 10 which comprises a system initializer 12 and a module manager 14. The system initializer 12 and the module manager 14 are employed to construct an application software program 20 from a plurality of modules 24. In a particular preferred embodiment of the invention, the application software program 20 is a server-based on-line analytical processing (OLAP) program.

Embodiments of the invention preferably take the form of computer executable instructions embedded in a computer-readable format on a CD-ROM, floppy disk or hard disk, or another computer-readable distribution medium. These instructions are executed by one or more processors (not shown) to implement the system software and OLAP software. A particular embodiment of the invention is commercially available as Express Server, Version 6.0, from Oracle Corporation.

The system initializer 12 is automatically executed once the kernel 10 is established on the host computer 1. The initializer 12 responds to configuration information from a configuration file 30 which has been created by a system administrator. The configuration file 30 lists all relevant modules 24 making up the application software program 20 and where the module files are located on disk. The system initializer 12 reads the configuration information and loads the modules that make up the application software program 20 into memory.

Once the modules 24 are loaded, the module manager 14 is executed to dynamically construct the modules into an operational set of code (i.e., the application software 20) by performing a number of different functions. The module manager 14 creates and maintains a module database 40 and an interface database 45. The module database 40 is essentially a list, derived from the configuration file 30, of all the modules 24 making up the application software program 20. The module manager 14 calls each of the modules to register each of the interfaces that the module supports into an interface database 45. Information that is registered includes the name of the interface and the pointer to the interface.

As the term is used herein, a module is a subset of object files and functionality that are linked together. Each module has a bootstrapping entry point or an exportable method called modMain. A module is preferably dynamically loadable and can be included in a function library with an entry point.

Each module also provides at least one interface for services. An interface provides a binary contact point between a supplier method and a consumer method. These complete interfaces are registered with the central interface database 45. Each module and interface is identified using a burned-in, universally unique identifiers (UUID). Typically, each module references one or more interfaces registered by other modules via the interface database 45. The modules can also provide a mechanism to dynamically cope with missing interfaces in the code image. Modules support standard callback interfaces for all management functions.

In addition, a module can support thread-local data (i.e., workspace) operations and can be optimized for multi-threaded operations. Modules also store and present version validation information. The modules also provide for dynamic integrity checks of process and thread run-time data integrity.

A module also has an organized code structure, clear functionality boundaries and highly-encapsulated data organization. Modules support global (process-oriented) constructors and destructors for appropriate initialization and termination processing. Similarly, the modules can support thread data-oriented constructors and destructors for appropriate initialization and termination processing. The modules also provide ordinality for coordinating global, thread local and error recovery processing across modules.

Figure 2:
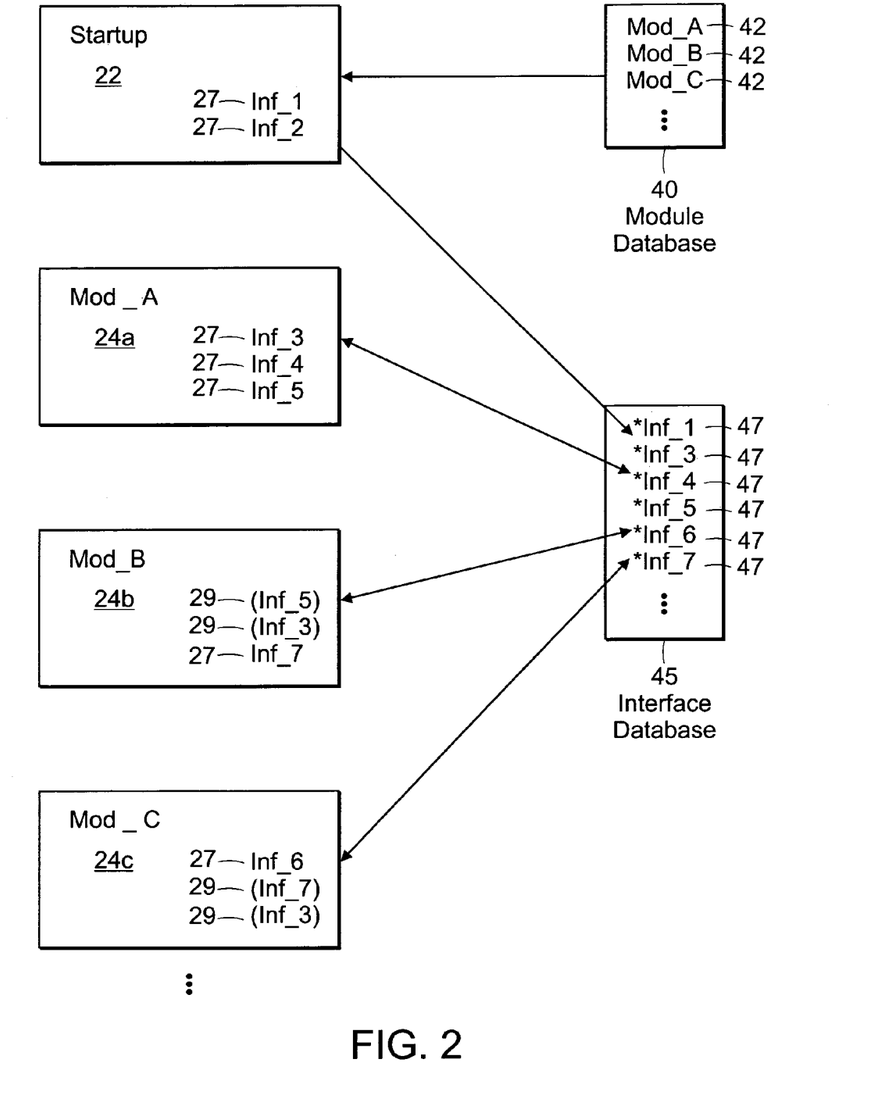
FIG. 2 is a schematic block diagram of module registration and resolution in accordance with a preferred embodiment of the invention.

FIG. 2 is a schematic block diagram of module registration and resolution in accordance with a preferred embodiment of the invention. As illustrated, there is a startup module 22 and a plurality of worker modules 24. Each module 22, 24 can define function method interfaces 27 or reference method interfaces 29 defined by other modules. The module database 40 includes a list of module entries 42 and the interface database 45 includes a list of pointers 47 to registered interfaces.

As illustrated, the startup module 22 defines two interfaces, Inf_1 and Inf_2. The identifiers for these interfaces along with the pointers to the function entry points for these interfaces are stored as entries 47 in the interface database 45.

A first worker module (MOD_A) 24A defines three interfaces, Inf_3, Inf_4 and Inf_5. Pointers to these interfaces are stored by the module manager as entries 47 in the interface database 45.

A second worker module (MOD_B) 24B defines one interface, Inf_7, and references two interfaces, Inf_5 and Inf_3. A pointer for the defined interface is stored in the interface database 37. Similarly, a third worker module (MOD_C) 24C defines a single interface, Inf_6, and references interfaces Inf_7 and Inf_3.

Note that the module database 40 specifies in what order the modules are loaded. In particular, the modules are loaded in an order such that interface references are always to an interface which has already been defined and registered in the interface database 45.

After the registration process, the module manager 14 knows all interfaces that are supported by the application software 20 and how those interfaces can be located and invoked. Thereafter, the module manager 14 resolves all of the interfaces for all the modules. In this process, the module manager provides to each module, for each interface that the module needs, a pointer to the needed interface. The interface references 29 are thereby dereferenced using the pointers stored in the interface database 45 for the respective interfaces. By so doing, the module manager 14 is tightly binding all the modules together by way of the pointers into a single set of executable code. The software is thus dynamically constructed.

Figure 3:
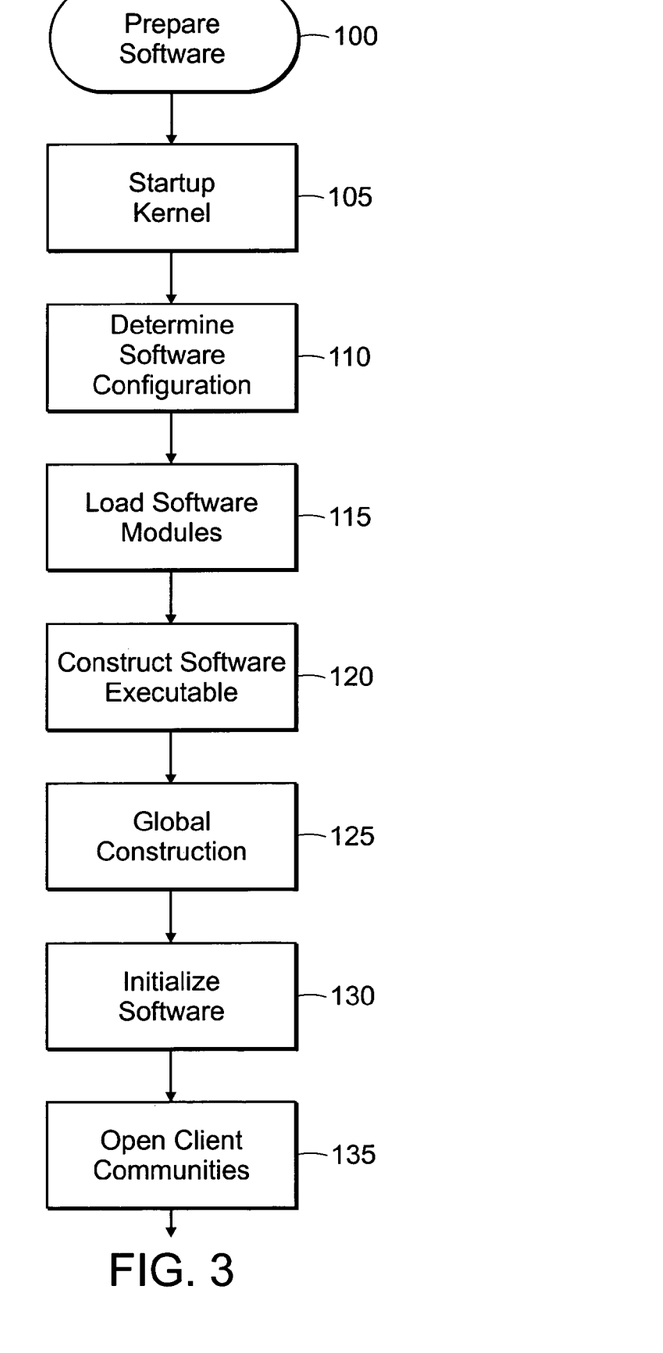
FIG. 3 is a flowchart of a preferred method of preparing an executable software program in accordance with the invention.

FIG. 3 is a flowchart of a preferred method of preparing an executable software program in accordance with the invention. At step 105, the kernel 10 is started by booting the host server computer. At step 110, the kernel 10 executes the system initializer 12, which determines the software configuration of the executable image of a target software application from the configuration file 30. At step 115, the system initializer 12 loads the required software modules into memory. At step 120, the module manager constructs an executable image for the target software. At step 125, the system constructs the global system to make the modules runnable. In particular, the module manager 14 calls each module to execute a global construction method. At step 130, the target software is initialized. Finally, at step 135 the kernel 10 resolves every external interface (RPC, XCA, Remote Oracle, etc.) to open the client communities for access to the target software.

Figure 4:
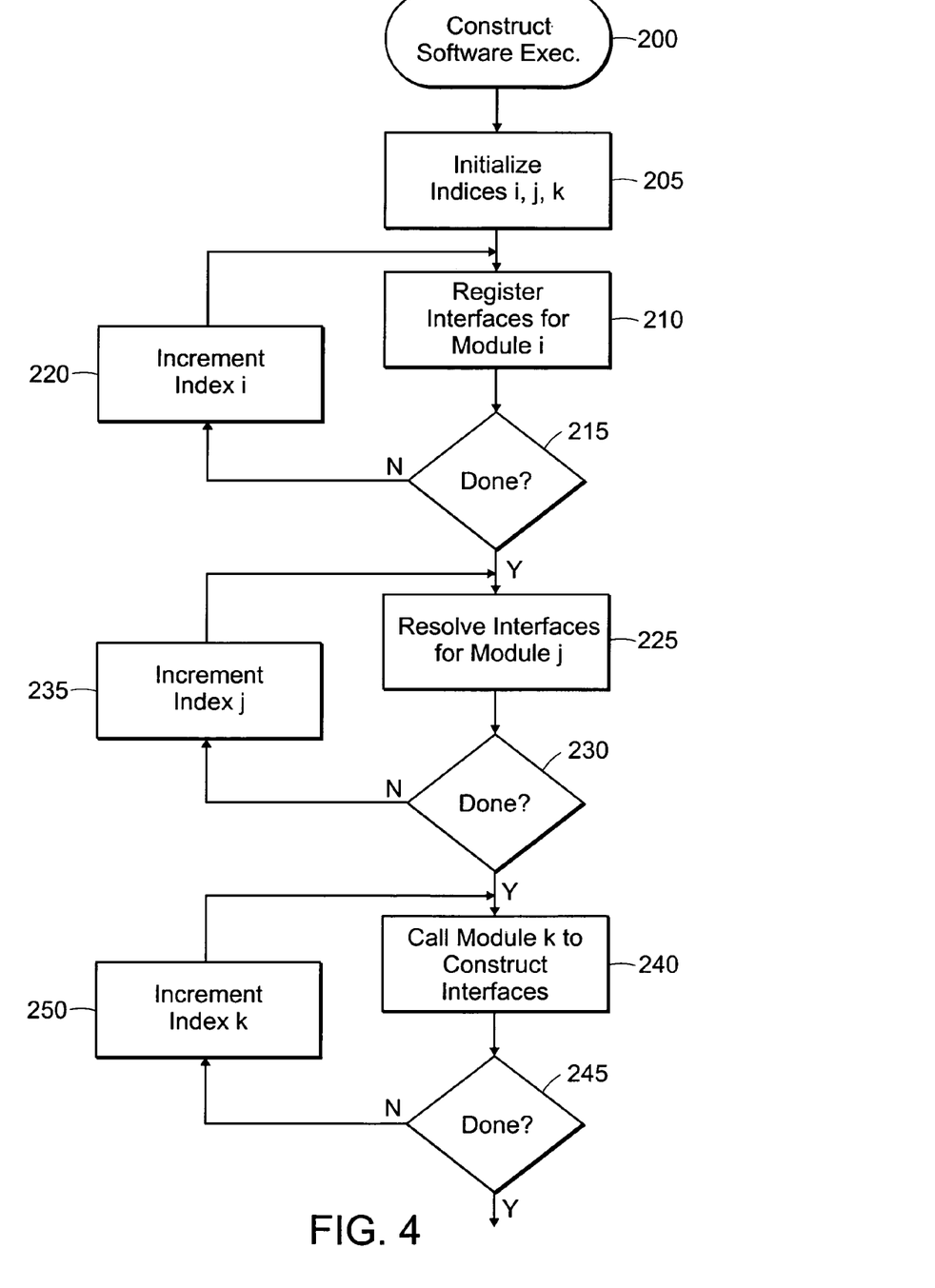
FIG. 4 is a flowchart of a preferred method of dynamically constructing an executable computer program in the method of FIG. 3.

FIG. 4 is a flowchart of a preferred method of dynamically constructing an executable computer program in the method of FIG. 3. Dynamic construction 200 is initiated at step 120 of FIG. 3. At step 205, indices i, j, k are initialized. At step 210, the interfaces for module i are registered in the interface database. At step 215, the value of the index i is checked. If there are more modules to register, processing returns to step 210 after incrementing the index i at step 220.

After all interfaces have been registered, processing continues to step 225 where all interfaces for module j are resolved. At step 230, the index is checked to see if all modules have been resolved. If not, then processing returns to step 225 after incrementing index j at step 235.

After all interfaces have been resolved, processing continues to step 240. At step 240, module k is called to construct its interfaces. At step 245, index k is checked to see if all modules have been constructed. If not, processing returns to step 240 after incrementing index k at step 250. After all interfaces have been constructed, the target application 20 is ready to be run.

Figure 5:
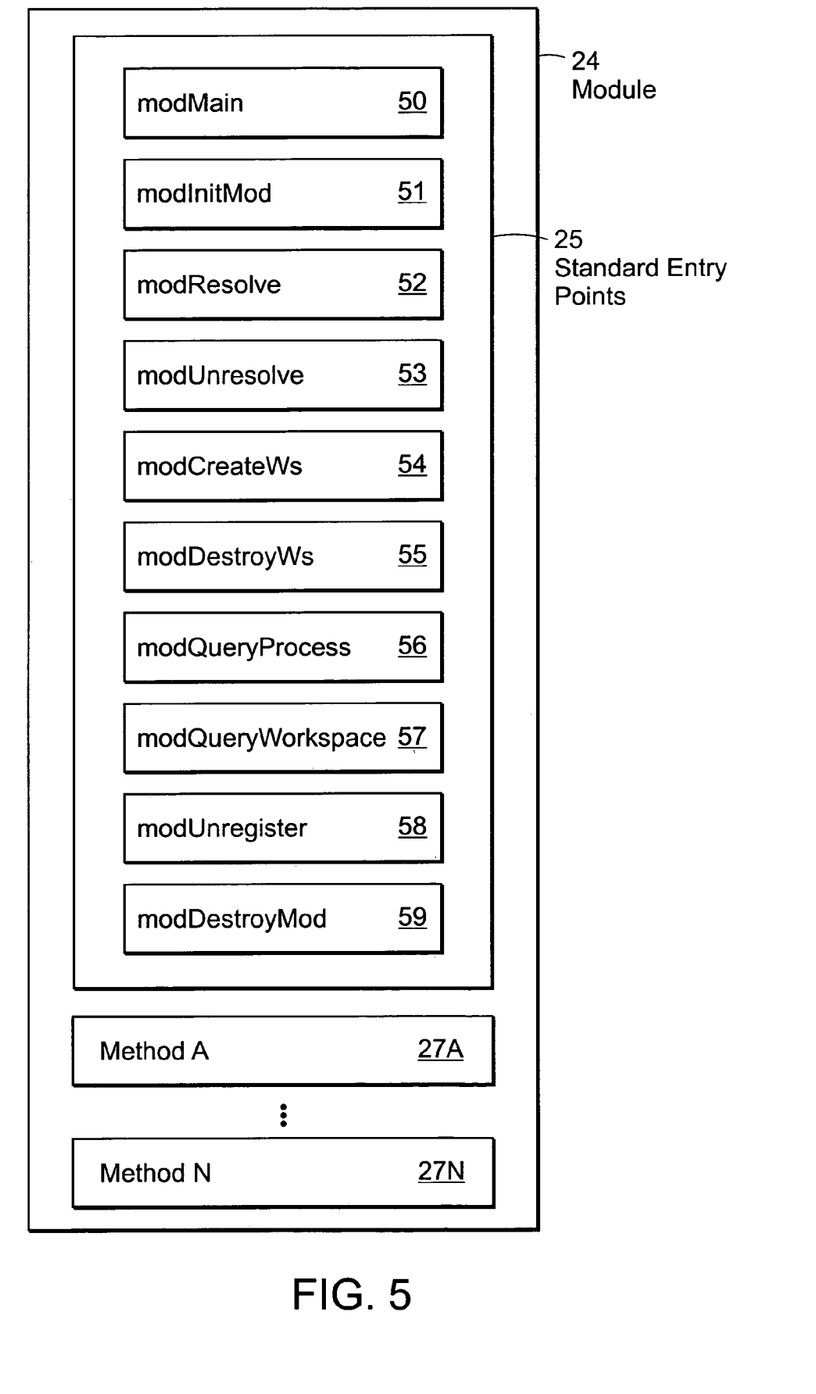
FIG. 5 is a schematic block diagram of a typical module in accordance with a preferred embodiment of the invention.

FIG. 5 is a schematic block diagram of typical module in accordance with a preferred embodiment of the invention. Each module 24 preferably includes a plurality of standard entry points 25, modMain 50, modInitMod 51, modResolve 52, modUnresolve 53, modCreateWs 54, modDestroyWs 55, modQueryProcess 56, modQueryWorkspace 57, modUnregister 58, and modDestroyMod 59. The modMain 50 function verifies the module and registers the interfaces. The modInitMod function 51 is a global constructor for the module. The modResolve function 52 is invoked to resolve module interfaces. The modUnresolve function 53 is called to unresolve a single interface. The modCreateWs function 54 is a constructor for thread-local (workspace) data. The modDestroyWs function 55 is a destructor of the thread-local (workspace) data. The modQueryProcess function 56 is invoked to query module integrity. The modQueryWorkspace function 57 is called to query workspace integrity. The modunregister function 58 is invoked to unregister all defined interfaces of the module. The modDestroyMod function 59 is a global destructor.

In addition to the standard entry point 25, a module 24 can include a plurality of service methods 27a, . . . , 27n having a respective interface.

A function skeleton in ANSI C of the standard entry points 25 of the module 24 is as follows:

```
bool modMain(hmod modHandle,
    if ModuleVfy_1* ipModuleVfy)
bool modInitMod(void)
bool modResolve(ifInterface_1* ipInterface)
bool modUnresolve(ifID)
ws* modCreateWs(hws wsHandle)
bool modDestroyWs(hws wsHandle)
bool modQueryProcess(hmod modHandle,
bool modQueryWorkspace(hmod modHandle,
bool modUnregister(ifInterface_1* ipInterface)
bool modDestroyMod( )
```

This code segment contains all the logic that implements the run-time properties of a run-time library, making it a module.

For each module, an instance of the following interface is maintained:

```
/* UUID for this inteface. */
#define  COMMONMODULE_ID  {0x3A79E0A0,
    0x322A,
0x1069,0x85,0x10,{0x00, 0x00, 0xF6, 0x0E, 0x0D,
    0xB6}}
/* Signature for this inteface. */
typedef const struct
    {
    bool(*modMain)(const hmod modHandle,
        if ModuleVfy_1 * const pifModuleVfy,
        if EvenLog_1 * const pifEventLog);
    bool(*modResolve)(ifInterface_1 * const pifInterface);
    bool(*modUnresolve)(ifid ifId);
    bool(*modInitMod)(void);
    bool(*modUnregister)(ifInterface_1  *  const
        pifInterface);
    bool(*modQueryProcess)(const hmod modHandle);
    bool(*modDestroyMod)(const unloadreason unloadReason);
    } if CommonModule_1;
```

Each interface includes a UUID, a structure definition that includes well-typed methods, and set of macros for normalizing references within the calling source code base. A prototypical interface specification is as follows:

```
#define  MODFUNCS_ID  {0x53FD4CE0, 0x144F,
    0x1069, 0x84, 0xE7, {0x00, 0x00, 0xF6, 0x0E, 0x0D,
    0xB6}}
#define MODFUNCS_NAME "ModFuncsMgr"
typedef const struct
{
ushort (* modfuncsMeth1)(hws wsHandle, int items);
}
if ModfuncsMgr_1
#ifdef MODFUNCS NAMES
#define                              modfuncsPubMeth1
    ipModfuncsMgr→modfuncsPubMeth1
#endif
```

Figure 6:
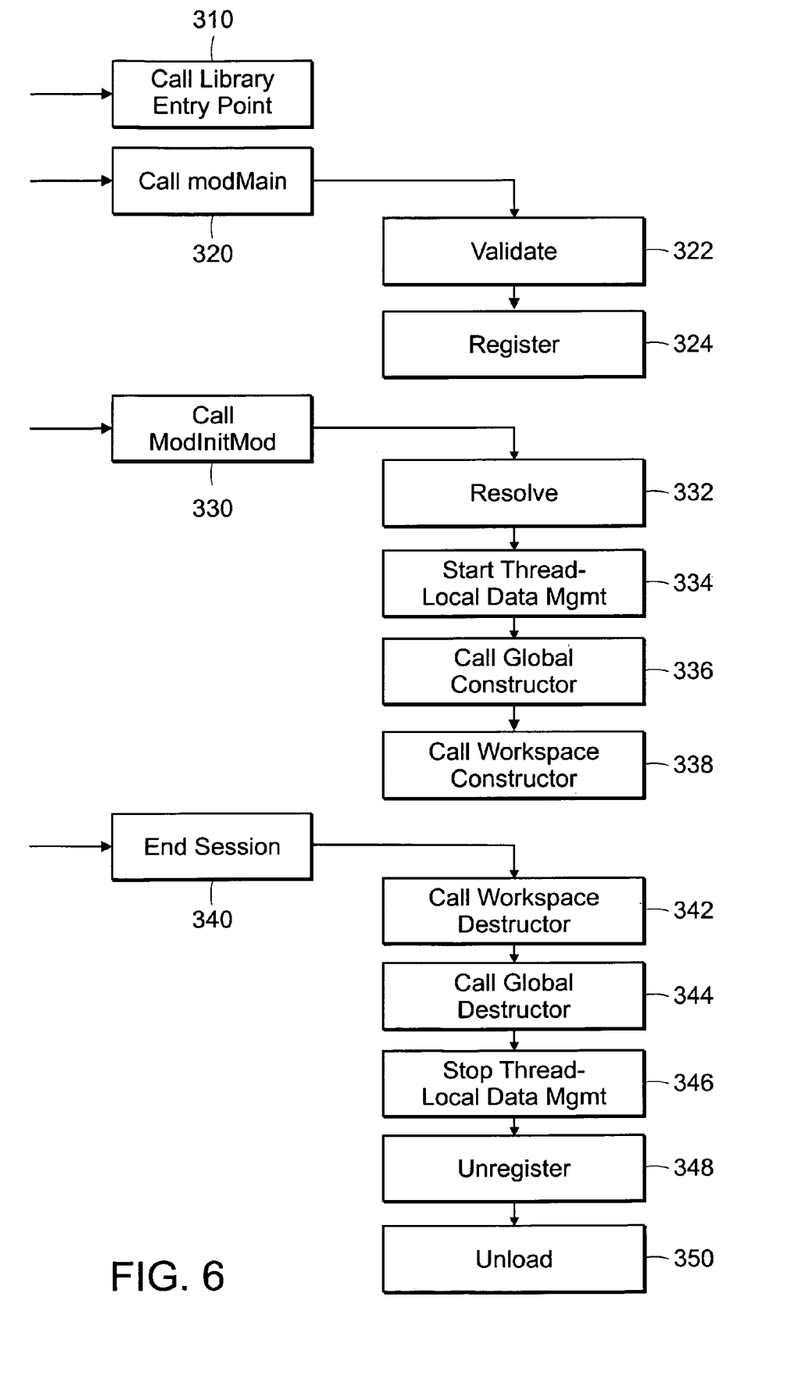
FIG. 6 is a process flow diagram for typical module operations in accordance with a preferred embodiment of the invention.

FIG. 6 is a process flow diagram for typical module operations in accordance with a preferred embodiment of the invention. First, at step 310 the operating system calls the dynamic library entry point for the module. At step 320, the module manager now calls modMain, which causes the module to validate itself at step 322 using the module version data and to register all the interfaces it provides at step 324. In particular, all modules register a common module interface and possibly a common thread local data interface.

The module manager next calls the global constructor, modInitMod, at step 330. In response, at step 332 the module resolves external interfaces provided by other modules. The module then starts thread-local data management for the module at step 334. Each module now calls its global constructor (modInitMod) to initialize process-level data at step 336 and a workspace constructor (modCreateWs) for each series of transaction to initialize thread-level data at step 338.

At the end of the last transaction for a session (step 340), each module calls its workspace destructor (modDestroyWs) to deinitialize thread-level data at step 342. Each module then calls its global destructor (modDestroyMod) to deinitialize process-level data at step 344. Each module then stops thread-local data management for the module at step 346. Each module then unregisters all the interfaces it provides by calling modUnregister at step 348 and, finally, unloads itself from the process code image at step 350.

In addition, from time-to-time, the system can call the modQueryProcess and modQueryWorkspace methods to test the integrity of each component.

By employing dynamic software construction, service interfaces can be separated from fixed modules. Interfaces are thus portable and can be migrated from one module to another. In other words, module boundaries can be adjusted or redefined to include or exclude a particular service. In addition, multiple generations of a service can operate in a single executable application program.

Equivalents

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

The invention claimed is:

1. A method of constructing an executable computer program from a plurality of dynamically loadable modules, comprising:
   creating a list of modules selected from a plurality of available modules for inclusion in the executable computer program, each module including at least one function entry point for a callable function;
   for each module in the list, registering the at least one function entry point in an interface database, comprising for each function:
      storing an identifier for the function in the interface database; and associating a pointer with the stored identifier, the pointer referencing the function entry point in the module.

2. The method of claim 1 wherein a first module includes an entry point for a first function and a second module includes a call to the first function, the method further comprising resolving the call to the first function with a first pointer stored in the interface database which references the entry point in the first module for the first function.

3. The method of claim 2 further comprising dereferencing the call to the first function with the first pointer.

4. The method of claim 1 wherein creating a list comprises listing the modules in a specified order.

5. The method of claim 1 further comprising bounding each function within a module boundary.

6. The method of claim 1 further comprising associating the identifier for each function with a generation of the respective function.

7. The method of claim 6 wherein the computer program includes calls to a plurality of generations of a function.

8. The method of claim 1 wherein a function references thread local data.

9. The method of claim 1 wherein registering is performed at an initialization time for the computer program.

10. The method of claim 1 wherein the module includes a bootstrapping entry point.

11. A method of constructing an executable computer program, comprising:
compiling a plurality of source code files into a plurality of dynamically loadable modules, each module defining a function;
defining a computer program referencing a plurality of functions defined by at least one of the modules;
initializing the computer program, comprising the initializing steps of:
storing a list of modules which define the functions referenced by the computer program in a module database;
for each module from the list, registering all functions defined therein in an interface database; and
resolving all function references using the interface database.

12. The method of claim 11 wherein storing a list comprises ordering the modules in the list in accordance with a specified order.

13. The method of claim 12 wherein the specified order is a loading order for the modules.

14. The method of claim 11 wherein registering and resolving are iteratively performed for each module such that all function references for a module are resolved from registered module functions.

15. The method of claim 11 wherein registering comprises:
storing an identifier for each defined interface in the interface database; and
associating a pointer with each stored identifier, each pointer referencing a function entry point.

16. The method of claim 15 wherein resolving comprises dereferencing functions with the associated pointer from the interface database.

17. The method of claim 11 wherein a first function has a plurality of generations referenced by the computer program, registering further comprising registering each generation of the first function.

18. The method of claim 11 further comprising bounding each function within a module boundary.

19. The method of claim 11 wherein a function references thread local data.

20. The method of claim 11 wherein storing a list of modules comprises deriving the list from user-modifiable configuration data.

21. The method of claim 20 further comprising modifying the computer program by modifying the list of configuration data.

22. The method of claim 10 wherein the module includes a bootstrapping entry point.

23. A system for constructing an executable computer program from a plurality of dynamically loadable modules, comprising:
a list of modules selected from a plurality of available modules for inclusion in the executable computer program, each module including at least one function entry point for a callable function; and
an interface database for registering the at least one function entry point of each module in the list, the interface database comprising for each function:
a stored identifier for the function; and
a pointer associated with the stored identifier, the pointer referencing the function entry point in the module.

24. The system of claim 23 wherein a first module includes an entry point for a first function and a second module includes a call to the first function, the system further comprising instructions to resolve the call to the first function with a first pointer stored in the interface database which references the entry point in the first module for the first function.

25. The system of claim 23 wherein the list lists the modules in a specified order.

26. The system of claim 23 wherein each function is bound within a module boundary.

27. The system of claim 23 wherein the identifier for each function is associated with a generation of the respective function.

28. The system of claim 27 wherein the computer program includes calls to a plurality of generations of a function.

29. The system of claim 27 wherein the executable computer program includes instructions for a plurality of generations of the respective function.

30. The system of claim 23 wherein a function references thread local data.

31. The system of claim 23 wherein registration in the interface database is performed at an initialization time for the computer program.

32. A system for constructing an executable computer program, comprising:
a plurality of source code files compiled into a plurality of dynamically loadable modules, each module defining a function;
a computer program referencing a plurality of functions defined by at least one of the modules;
an initialization mechanism of the computer program, comprising:
a list of modules which define functions referenced by the computer program stored in a module database;
for each module from the list, all functions defined therein registered in an interface database; and
all function references resolved using the interface database.

33. The system of claim 32 wherein the call to the first function is dereferenced with the first pointer.

34. The system of claim 32 wherein the modules in the list are ordered in accordance with a specified order.

35. The system of claim 34 wherein the specified order is a loading order for the modules.

36. The system of claim 32 wherein all function references for a module are resolved from registered module functions through an iterative process.

37. The system of claim 32 wherein the interface database comprises:
an identifier for each defined interface stored in the interface database; and
a pointer associated with each stored identifier, each pointer referencing a function entry point.

38. The system of claim 37 wherein functions references are dereferenced with the associated pointer from the interface database.

39. The system of claim 32 wherein a first function has a plurality of generations referenced by the computer program, each generation of the first function registered on the interface database.

40. The system of claim 32 wherein each function is bound within a module boundary.

41. The system of claim 32 wherein a function references thread local data.

42. The system of claim 32 wherein the stored list of modules comprises a list of modules derived from user-modifiable configuration data.

43. An article of manufacture, comprising:
a computer-readable medium;
a computer program recorded in the medium, the computer program including instructions for causing a computer to perform a method of constructing an executable computer program from a plurality of dynamically loadable modules, comprising:
creating a list of modules selected from a plurality of available modules for inclusion in the executable computer program, each module including at least one function entry point for a callable function;
for each module in the list, registering the at least one function entry point in an interface database, comprising for each function:
storing an identifier for the function in the interface database; and
associating a pointer with the stored identifier, the pointer referencing the function entry point in the module.

44. The article of claim 43 wherein a first module includes an entry point for a first function and a second module includes a call to the first function, and the instructions further comprising resolving the call to the first function with a first pointer stored in the interface database which references the entry point in the first module for the first function.

45. The article of claim 44 further comprising dereferencing the call to the first function with the first pointer.

46. The article of claim 43 wherein creating a list comprises listing the modules in a specified order.

47. The article of claim 43 further comprising bounding each function within a module boundary.

48. The article of claim 43 further comprising associating the identifier for each function with a generation of the respective function.

49. The article of claim 48 wherein the computer program includes calls to a plurality of generations of a function.

50. The article of claim 48 wherein the executable computer program includes instructions for a plurality of generations of the respective function.

51. The article of claim 43 wherein a function references thread local data.

52. The article of claim 43 wherein registering is performed at an initialization time for the computer program.

53. An article of manufacture, comprising:
a computer-readable medium;
a computer program recorded in the medium, the computer program including instructions for causing a computer to perform a method of constructing an executable computer program, comprising:
compiling a plurality of source code files into a plurality of dynamically loadable modules, each module defining a function;
defining a computer program referencing a plurality of functions defined by at least one of the modules;
initializing the computer program, comprising the initializing steps of:
storing a list of modules which define functions referenced by the computer program in a module database;
for each module from the list, registering all functions defined therein in an interface database; and
resolving all function references using the interface database.

54. The article of claim 53 wherein storing a list comprises ordering the modules in the list in accordance with a specified order.

55. The article of claim 54 wherein the specified order is a loading order for the modules.

56. The article of claim 53 wherein registering and resolving are iteratively performed for each module such that all function references for a module are resolved from registered module functions.

57. The article of claim 53 wherein registering comprises:
storing an identifier for each defined functions in the interface database; and
associating a pointer with each stored identifier, each pointer referencing a function entry point.

58. The article of claim 57 wherein resolving comprises dereferencing functions with the associated pointer from the interface database.

59. The article of claim 53 wherein a first function has a plurality of generations referenced by the computer program, registering further comprising registering each generation of the first function.

60. The article of claim 53 further comprising instructions for bounding each function within a module boundary.

61. The article of claim 53 wherein a function references thread local data.

62. The article of claim 53 wherein storing a list of modules comprises deriving the list from user-modifiable configuration data.

63. The article of claim 62 further comprising instructions for modifying the computer program by modifying the list of configuration data.

64. A method of constructing an executable computer program from a plurality of dynamically loadable modules stored as module files on disk, comprising:
creating a configuration file identifying a plurality of modules for inclusion in an executable computer program;
from a system initializer, loading the module files identified in the configuration file into memory;
from a module manager:
creating a module database, the module database including an ordered list of modules selected from the configuration file, each module including at least one function entry point for a callable function;

for each module in the module database, registering the at least one function entry point in an interface database, comprising for each function:

storing an identifier for the function in the interface database;

associating a pointer with the stored identifier, the pointer referencing the function entry point in the module; and binding the modules together into the executable computer program using the pointer stored in the interface database for each function.

65. The method of claim 64 wherein a first module includes an entry point for a first function and a second module includes a call to the first function, the method further comprising resolving the call to the first function with a first pointer stored in the interface database which references the entry point in the first module for the first function.

66. The method of claim 65 further comprising dereferencing the call to the first function with the first pointer.

67. The method of claim 64 further comprising bounding each function within a module boundary.

68. The method of claim 64 further comprising associating the identifier for each function with a generation of the respective function.

69. The method of claim 68 wherein the executable computer program includes a plurality of generations of the respective function.

70. The method of claim 64 wherein registering is performed at an initialization time for the computer program.

71. A system for constructing an executable computer program from a plurality of dynamically loadable modules, comprising:

means for creating a list of modules selected from a plurality of available modules for inclusion in the executable computer program, each module including at least one function entry point for a callable function;

for each module in the list, means for registering the at least one function entry point in an interface database, comprising for each function:

means for storing an identifier for the function in the interface database; and means for associating a pointer with the stored identifier, the pointer referencing the function entry point in the module.

72. The system of claim 71 wherein a first module includes an entry point for a first function and a second module includes a call to the first function, the system further comprising means for resolving the call to the first function with a first pointer stored in the interface database which references the entry point in the first module for the first function.

73. The system of claim 71 further comprising means for dereferencing the call to the first function with the first pointer.

74. The system of claim 71 wherein the creating a list means comprises means for listing the modules in a specified order.

75. System of claim 71 further comprising means for bounding each function within a module boundary.

76. The system of claim 71 further comprising means for associating the identifier for each function with a generation of the respective function.

77. The system of claim 76 wherein the computer program includes calls to a plurality of generations of a function.

78. The system of claim 71 wherein a function references thread local data.

79. The system of claim 71 wherein the registering means is performed at an initialization time for the computer program.

80. The system of claim 71 wherein the module includes a bootstrapping entry point.

81. A system for constructing an executable computer program, comprising:

means for compiling a plurality of source code files into a plurality of dynamically loadable modules, each module defining a function;

means for defining a computer program referencing a plurality of functions defined by at least one of the modules;

means for initializing the computer program, comprising the initializing steps of:

means for storing a list of modules which define the functions referenced by the computer program in a module database;

for each module from the list, means for registering all functions defined therein in an interface database; and means for resolving all function references using the interface database.

82. The system of claim 81 wherein the storing a list means comprises means for ordering the modules in the list in accordance with a specified order.

83. The system of claim 82 wherein the specified order is a loading order for the modules.

84. The system of claim 81 wherein the registering and resolving means are iteratively performed for each module such that all function references for a module are resolved from registered module functions.

85. The system of claim 81 wherein the registering means comprises:

means for storing an identifier for each defined interface in the interface database; and means for associating a pointer with each stored identifier, each pointer referencing a function entry point.

86. The system of claim 85 wherein the resolving means comprises means for dereferencing functions with the associated pointer from the interface database.

87. The system of claim 81 wherein a first function has a plurality of generations referenced by the computer program, the registering means further comprising means for registering each generation of the first function.

88. The system of claim 81 further comprising means for bounding each function within a module boundary.

89. The system of claim 81 wherein a function references thread local data.

90. The system of claim 81 wherein the storing a list of modules means comprises means for deriving the list from user-modifiable configuration data.

91. The system of claim 90 further comprising means for modifying the computer program by modifying the list of configuration data.

92. The system of claim 81 wherein the module includes a bootstrapping entry point.

93. A system for constructing an executable computer program from a plurality of dynamically loadable modules stored as module files on disk, comprising:

means for creating a configuration file identifying a plurality of modules for inclusion in an executable computer program;

in a system initializer, means for loading the module files identified in the configuration file into memory;

from a module manager:
- means for creating a module database, the module database including an ordered list of modules selected from the configuration file, each module including at least one function entry point for a callable function;
- for each module in the module database, means for registering the at least one function entry point in an interface database, comprising for each function:
  - means for storing an identifier for the function in the interface database;
  - means for associating a pointer with the stored identifier, the pointer referencing the function entry point in the module; and
  - means for binding the modules together into the executable computer program using the pointer stored in the interface database for each function.

94. The system of claim 93 wherein a first module includes an entry point for a first function and a second module includes a call to the first function, the system further comprising means for resolving the call to the first function with a first pointer stored in the interface database which references the entry point in the first module for the first function.

95. The system of claim 94 further comprising means for dereferencing the call to the first function with the first pointer.

96. The system of claim 93 further comprising means for bounding each function within a module boundary.

97. The system of claim 93 further comprising means for associating the identifier for each function with a generation of the respective function.

98. The system of claim 97 wherein the executable computer program includes a plurality of generations of the respective function.

99. The system of claim 93 wherein the registering means is performed at an initialization time for the computer program.

* * * * *

UNITED STATES PATENT AND TRADEMARK OFFICE
CERTIFICATE OF CORRECTION

| | |
|---|---|
| PATENT NO. | : 7,155,701 B1 |
| APPLICATION NO. | : 08/866744 |
| DATED | : May 30, 1997 |
| INVENTOR(S) | : Gongwer et al. |

It is certified that error appears in the above-identified patent and that said Letters Patent is hereby corrected as shown below:

Title page under Item (73) Assignee, please change it to --Oracle International Corporation, Redwood Shores, CA (US)--.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,155,701 B1 |
| APPLICATION NO. | : 08/866744 |
| DATED | : December 26, 2006 |
| INVENTOR(S) | : Gongwer et al. |

It is certified that error appears in the above-identified patent and that said Letters Patent is hereby corrected as shown below:

Title page under Item (73) Assignee, please change it to --Oracle International Corporation, Redwood Shores, CA (US)--.

This certificate supersedes the Certificate of Correction issued November 18, 2008.

Signed and Sealed this

Ninth Day of December, 2008

JON W. DUDAS
*Director of the United States Patent and Trademark Office*